United States Patent
Ogino

(10) Patent No.: US 9,264,603 B2
(45) Date of Patent: Feb. 16, 2016

(54) IMAGING APPARATUS AND IMAGING METHOD

(71) Applicant: CANON KABUSHIKI KAISHA, Tokyo (JP)

(72) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/461,259

(22) Filed: Aug. 15, 2014

(65) Prior Publication Data

US 2015/0054976 A1 Feb. 26, 2015

(30) Foreign Application Priority Data

Aug. 21, 2013 (JP) ................................ 2013-171639
May 20, 2014 (JP) ................................ 2014-104494

(51) Int. Cl.
*H04N 5/232* (2006.01)

(52) U.S. Cl.
CPC ....... *H04N 5/23212* (2013.01); *H04N 5/23216* (2013.01); *H04N 5/23219* (2013.01); *H04N 5/23245* (2013.01); *H04N 5/23293* (2013.01)

(58) Field of Classification Search
CPC .......... H04N 5/23212; H04N 5/23216; H04N 5/23219; H04N 5/23245; H04N 5/23293; H04N 5/343

See application file for complete search history.

(56) References Cited

U.S. PATENT DOCUMENTS

| | | | | |
|---|---|---|---|---|
| 2006/0238622 | A1* | 10/2006 | Shimosato | H04N 5/23245 348/220.1 |
| 2008/0088740 | A1* | 4/2008 | Kondo | H04N 5/44591 348/556 |
| 2012/0105599 | A1* | 5/2012 | Lin | G06T 5/006 348/50 |
| 2012/0237193 | A1* | 9/2012 | Kawarada | G02B 7/34 396/95 |

FOREIGN PATENT DOCUMENTS

JP 2004-205885 A 7/2004

\* cited by examiner

*Primary Examiner* — Daniel M Pasiewicz
(74) *Attorney, Agent, or Firm* — Canon USA, Inc., IP Division

(57) ABSTRACT

Until a face detection result is obtained after a moving-image recording operation starts, a focal-point detection area may be set at a position based on a face detection result before the moving-image recording operation. The focal-point detection area may be set so as to fit within the angle of view after the moving-image recording operation.

10 Claims, 6 Drawing Sheets

IMAGING APPARATUS AND IMAGING METHOD

BACKGROUND OF THE INVENTION

1. Field of the Invention

The present invention relates to imaging apparatuses having a focus adjustment function such as an electronic still camera and a camcorder and imaging methods therefor.

2. Description of the Related Art

Conventionally, a technology has been known which detects a main subject from a captured screen. For example, a face identified from a feature of the eye or mouth of a human figure or an object identified from its color or luminance level may be detected as a main subject. In this case, the position and size of the main subject may often be output as a detection result.

Another technology has been known which handles a subject at a position touched and designated by a photographer on a touch panel as a main subject. Another technology has been known which handles a subject identified by a photographer by manipulating an operating member such as a four-way operational switch to move an instruction cursor displayed on an image-capturing standby screen as a main subject. The thus detected main subject is used as a target for focusing an imaging lens.

On the other hand, for an autofocus (hereinafter, called AF) function used in an electronic still camera or a camcorder, for example, a method has been used in which a lens position where a high-frequency component of a luminance level signal acquired from an image pick-up device such as a CCD is at a maximum is defined as an in-focus position. In this case, a method has been known in which a main subject detected in the manner as described above is defined as a ranging target area (hereinafter, called a focal-point detection area or an AF frame).

Japanese Patent Laid-Open No. 2004-205885 discloses that the center of a position in an image-capturing range designated by a user is defined as a focal-point detection area.

When still images and moving images are both captured with one camera, control may be switched between optimum modes of an image pick-up device for a still image capturing operation, a moving image capturing operation and an image-capturing standby state. However, when a moving image capturing operation is performed without changing a focal-point detection area set in a moving image-capturing standby state, the focal-point detection area may not possibly be set accurately at a subject position set in the moving image-capturing standby state.

This is caused because the number of pixels readout by the image pick-up device differs in a moving image-capturing standby state and a moving image capturing operation and thus the aspect ratio of the screen may differ.

Furthermore, when a face detected by a camera is to be defined as a main subject, it takes time after switching the control of the image pick-up device until a face detection result is output. Therefore, a face detection result is not acquired immediately after a moving image capturing operation starts, and a focal-point detection area may not possibly be set.

SUMMARY OF THE INVENTION

An aspect of the present invention provides an imaging apparatus including an image pick-up device, a subject detecting unit configured to detect a subject identified by using an output from the image pick-up device, a focus adjusting unit configured to perform focus adjustment by using a focal point detection signal acquired by detecting a subject image corresponding to a focal-point detection area including the identified subject by using the image pick-up device, and an instruction unit configured to instruct a position of the focal-point detection area, wherein a first image capturing recording mode and a second image capturing recording mode are provided which present screens having different aspect ratios, and, in a case where the second image capturing recording mode is started after the focal-point detection area is instructed by the instruction unit in the first image capturing recording mode, a position of a focal-point detection area in the second image capturing recording mode is determined based on a position of a focal-point detection area in the first image capturing recording mode until the identified subject is detected by the subject detecting unit after the second image capturing recording mode is started.

Further features of the present invention will become apparent from the following description of exemplary embodiments with reference to the attached drawings.

DESCRIPTION OF THE EMBODIMENTS

Embodiments of the present invention will be described in detail with reference to drawings.

A first image capturing recording mode may be a still picture recording mode, and a second image capturing recording mode may be a moving image recording mode. The first image capturing recording mode and the second image capturing recording mode have different aspect ratios.

Block Diagram of Imaging Apparatus

Figure 1:
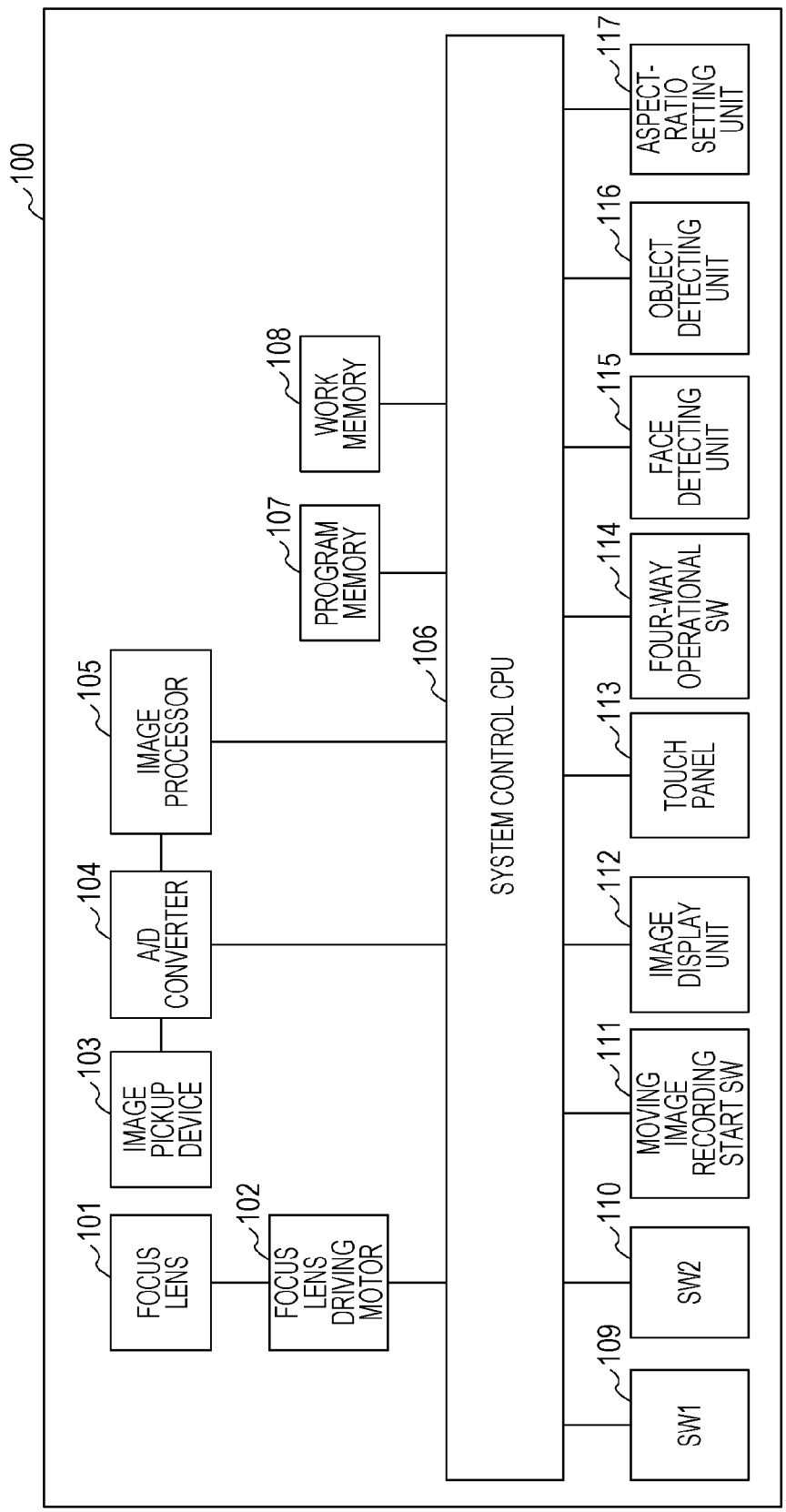
FIG. 1 is a block diagram illustrating a schematic constitution of an electronic still camera to which an automatic focusing device according to an exemplary embodiment of the present invention is applied.

FIG. 1 is a block diagram illustrating a schematic constitution of an electronic still camera corresponding to an imaging apparatus having a moving-image recording function according to an exemplary embodiment of the present invention.

An electronic still camera 100 includes an automatic focusing device configured to move a focus lens along its optical axis to perform focus adjustment so that a subject image may be focused on an image pick-up device.

The electronic still camera 100 includes a focus lens 101, a focus lens driving motor 102, an image pick-up device 103, an A/D converter 104, an image processor 105, a microcontroller (hereinafter called a CPU) 106, a program memory 107, and a work memory 108. The focus lens 101 is usable for focusing on an image pick-up device, which will be described below. The focus lens driving motor 102 is configured to move the focus lens 101 along its optical axis. The image pick-up device 103 is configured to convert incident light from a subject to an electric signal.

The A/D converter 104 is configured to convert an analog signal output from the image pick-up device 103 to a digital signal. The image processor 105 is configured to perform a predetermined process on image data output from the A/D converter 104.

The microcontroller 106 is configured to control a system for an image-capturing sequence, for example. The program memory 107 is configured to store a program to be executed by the CPU 106. The work memory 108 is configured to temporarily store data necessary for performing a process by the CPU 106 in accordance with a program stored in the program memory 107.

The CPU 106 serves as a focus adjusting unit configured to perform focus adjustment by using a focal point detection signal acquired by detecting a subject image corresponding to a focal-point detection area including a specific subject by the image pick-up device 103.

The electronic still camera 100 further includes an image-capturing preparation instruction switch (hereinafter called "SW1") 109, an image-capturing processing instruction switch (hereinafter, called "SW2") 110, a moving-image recording start switch 111, an image display unit 112, and a touch panel 113. The SW1_109 is usable for instructing preparation for an image-capturing operation such as automatic exposure control (hereinafter, called "AE") and AF. The SW2_110 is usable for instructing an image-capturing process such as main exposure and printing operations after the image-capturing preparation instruction switch 109 is operated. The moving-image recording start switch 111 is usable to instruct to start recording moving images.

The image display unit 112 displays an image. The touch panel 113 is usable to instruct an operation or a setting to the camera by touching thereon with a finger or a tip of a pen by an operator. The touch panel 113 is provided over the image display unit 112, and a position on a touch screen of the touch panel 113 serving as an instruction unit corresponds to a position on a display screen of the image display unit 112 in one-to-one manner.

In the following descriptions, to touch a position on the touch panel 113 corresponding to an image or an icon displayed on the image display unit 112 will be simply expressed as "touch an image" or "touch an icon".

The electronic still camera 100 further includes a four-way operational switch 114, a face detecting unit 115, an object detecting unit 116, and an aspect ratio setting unit 117. The four-way operational switch 114 is usable to select a menu item or instruct to move a focal-point detection area displayed on the image display unit 112. The face detecting unit 115 serves as a subject detecting unit configured to detect a face of a human figure from image data processed in the image processor 105. The object detecting unit 116 is configured to detect an object excluding a face of a human figure from image data processed in the image processor 105. The aspect ratio setting unit 117 is configured to set aspect ratios of a still image and moving images (or an aspect ratio of an image) to be recorded.

Next, an operation process of the electronic still camera 100 in FIG. 1 will be described. In the following descriptions, an operation such as storing and determining is performed by the CPU 106 in accordance with a program stored in the program memory 107 unless otherwise specified. The CPU 106 stores a calculation result and processing data in the work memory 108 unless otherwise specified.

Flowchart Illustrating Flow of Operation Process for Image Capturing

Figure 2:
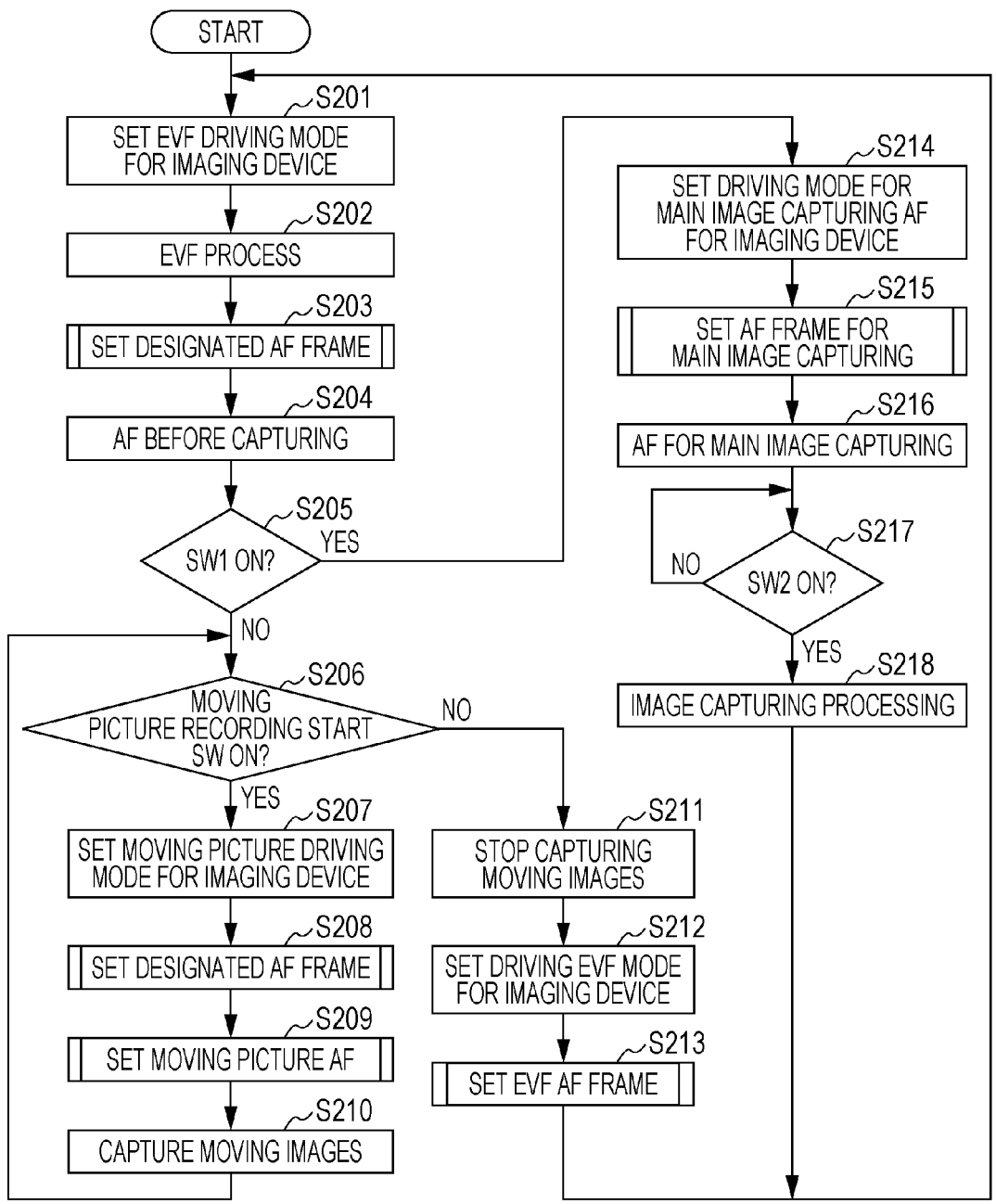
FIG. 2 is a flowchart illustrating a flow of an operating process during an image-capturing operation in the electronic still camera in FIG. 1.

FIG. 2 is a flowchart illustrating a flow of an operation process for image capturing in the electronic still camera 100 in FIG. 1.

First, in S201, a driving mode for an EVF (hereinafter, called EVF driving mode) is set for the image pick-up device 103. The driving mode here may include a selection of a line to be read out (hereinafter, called a readout line) by the image pick-up device, a selection of a pixel addition method, and a setting for a frame rate. The aspect ratio of an image depends on how the readout line is selected. The EVF driving mode here is assumed in which an aspect ratio of a width to a height is set to 4:3 by the aspect ratio setting unit 117.

It should be noted that the already set EVF driving mode is not reset. In S202, an EVF process is performed for displaying an image for an image-capturing standby state on the image display unit 112. The EVF process may include AE, auto white balance (AWB), image processing for display, and image display processing for the image display unit 112. In S203, a focal-point detection area for a subject designated by a photographer is set in accordance with a procedure, which will be described below.

In S204, the focal-point detection area set in S203 is used to perform an AF operation before an image-capturing operation is performed. In the AF operation before an image-capturing operation, a focal point is detected by defining, as an in-focus position, a lens position where a high-frequency component of a luminance level from an image signal acquired from the focal-point detection area set in S304, S305, S310 or S311.

In S205, a state of the SW1_109 is detected. If it is determined that the SW1_109 has an ON state, the processing moves to S214. If not, the processing moves to S206.

In S206, a state of the moving-image recording start switch 111 is detected. If the moving-image recording start switch 111 has an ON state, the processing moves to S207 where a moving image capturing operation is started. If not, the processing moves to S211. In S207, the driving mode of the image pick-up device 103 is set for a moving image capturing operation. The driving mode for a moving image capturing operation is assumed in which an aspect ratio of a width to a height is set to 16:9 by the aspect ratio setting unit 117.

The driving mode already set for a moving image capturing operation is not reset. In S208, a focal-point detection area for a subject designated by a photographer is set, similarly to S203. In S209, a focal-point detection area for a moving image capturing operation is set in accordance with a procedure which will be described below. In S210, the focal-point detection area set in S209 is used to perform AF and at the same time perform a moving image capturing operation.

In S211, the moving image capturing operation is stopped. In S212, the driving mode for the image pick-up device 103 is set to the one for EVF. This is the same process as that in S201. In S213, a focal-point detection area for EVF is set in accordance with a procedure which will be described below.

In S214, the driving mode for the image pick-up device 103 is set to the one for AF for a main image-capturing operation. In the driving mode for AF for a main image-capturing operation, the aspect ratio of a width to a height is set to 4:3 by the aspect ratio setting unit 117. In S215, a focal-point detection area for AF for a main image-capturing operation is set in accordance with a procedure which will be described below. In S216, the focal-point detection area set in S215 is used to perform AF.

In S217, the state of the SW2_110 is detected. If it is determined that the SW2_110 has an ON state, the processing moves to S218. If not, the state of the SW2_110 is detected again. In S218, an image-capturing process is performed including exposure and readout to the image pick-up device 103, image processing by the image processor 105, and recording to a recording medium, not illustrated.

Flowchart Illustrating Designated AF Frame Setting

Figure 3:
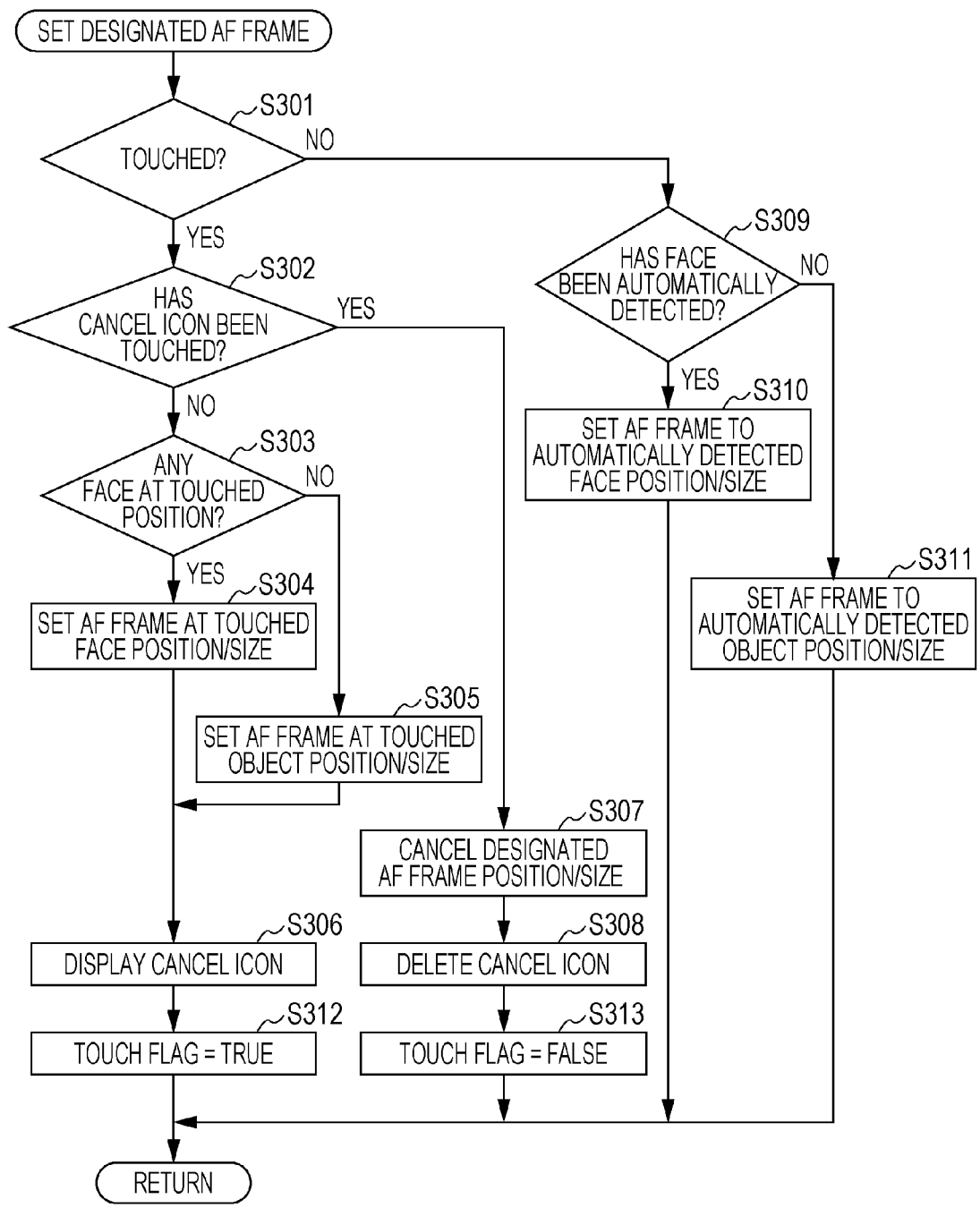
FIG. 3 is a flowchart illustrating a designated AF frame setting process in FIG. 2.

FIG. 3 is a flowchart illustrating the setting of a designated AF frame in S203 in FIG. 2. First, in S301, whether a photographer has touched the touch panel 113 serving as an instruction unit is determined. If so, the processing moves to S302. If not, the processing moves to S309. In S302, whether a photographer has touched a cancel icon, which will be described below, is determined. If so, the processing moves to S307. If not, the processing moves to S303.

It is assumed that the cancel icon is deleted in advance in an initialization process, not illustrated. In S303, whether a face is being displayed at a position on the image display unit 112 corresponding to the position touched in S301 is determined. If so, the processing moves to S304. If not, the processing moves to S305.

This determination is based on the position and size of the face detected by the face detecting unit 115 from an image processed in the image processor 105.

In S304, the focal-point detection area corresponding to the position and size of the face touched in S301 is set. At the same time, an AF frame having a position and a size corresponding to the face is displayed on the image display unit 112. In S305, the position and size of the focal-point detection area are set in accordance with the size of an object at the position touched in S301. At the same time, an AF frame having a position and a size corresponding to the object is displayed on the image display unit 112.

The size of the object is detected by the object detecting unit 116 based on a luminance level and color of an image signal and a correlation of images captured at different times. In S306, a cancel icon is displayed on the image display unit 112. In S312, a touch flag indicative of TRUE is set. The touch flag here indicates that a photographer has touched the touch panel 113.

If a touch flag indicative of TRUE is set, it indicates a state that a subject has been designated. If a touch flag indicative of FALSE is set, it indicates a state that a cancel icon has been touched to cancel the designation of a subject. The touch flag is set in advance to FALSE in an initialization process, not illustrated.

In S307, the position and size of the focal-point detection area set in S304 or S305 are cancelled. The AF frame displayed in S304 or S305 is also deleted. In S308, the cancel icon displayed in S306 is deleted. In S313, the touch flag is set to FALSE.

In S309, whether the face detecting unit 115 has automatically detected a face or not is determined. If so, the processing moves to S310. If not, the processing moves to S311. The automatic determination here refers to automatic detection/determination of a face by a camera without a touch designation operation on a touch panel by a photographer.

In S310, the focal-point detection area corresponding to the position and size for the face automatically detected by the camera is set. At the same time, an AF frame having a position and size corresponding to the face is displayed on the image display unit 112. In S311, the position and size of the focal-point detection area is set in accordance with the size of an object at the position automatically detected by the camera. The automatic detection of an object is performed by the object detecting unit 116. At the same time, an AF frame having the position and size corresponding to the object is displayed on the image display unit 112.

Repeatedly performing the operation process in FIG. 3 includes resetting a focal-point detection area in S304 and S305 every time a face or an object touched and designated by a photographer moves or changes its size so that a focal-point detection area based on the positions and the sizes of the face or object may be set.

A photographer may designate a face or an object by operating the four-way operational switch 114 instead of the touch panel 113.

The configuration in FIG. 3 may allow a photographer to designate a desirable face or object by touching or operating a four-way operational switch and thus set a focal-point detection area. The configuration further allows cancellation of such a designation. In a case where a photographer does not designate, a focal-point detection area may be set for a face or object detected automatically by the camera.

Focal-Point Detection Area Setting For Moving Image Capturing Operation

Figure 4:
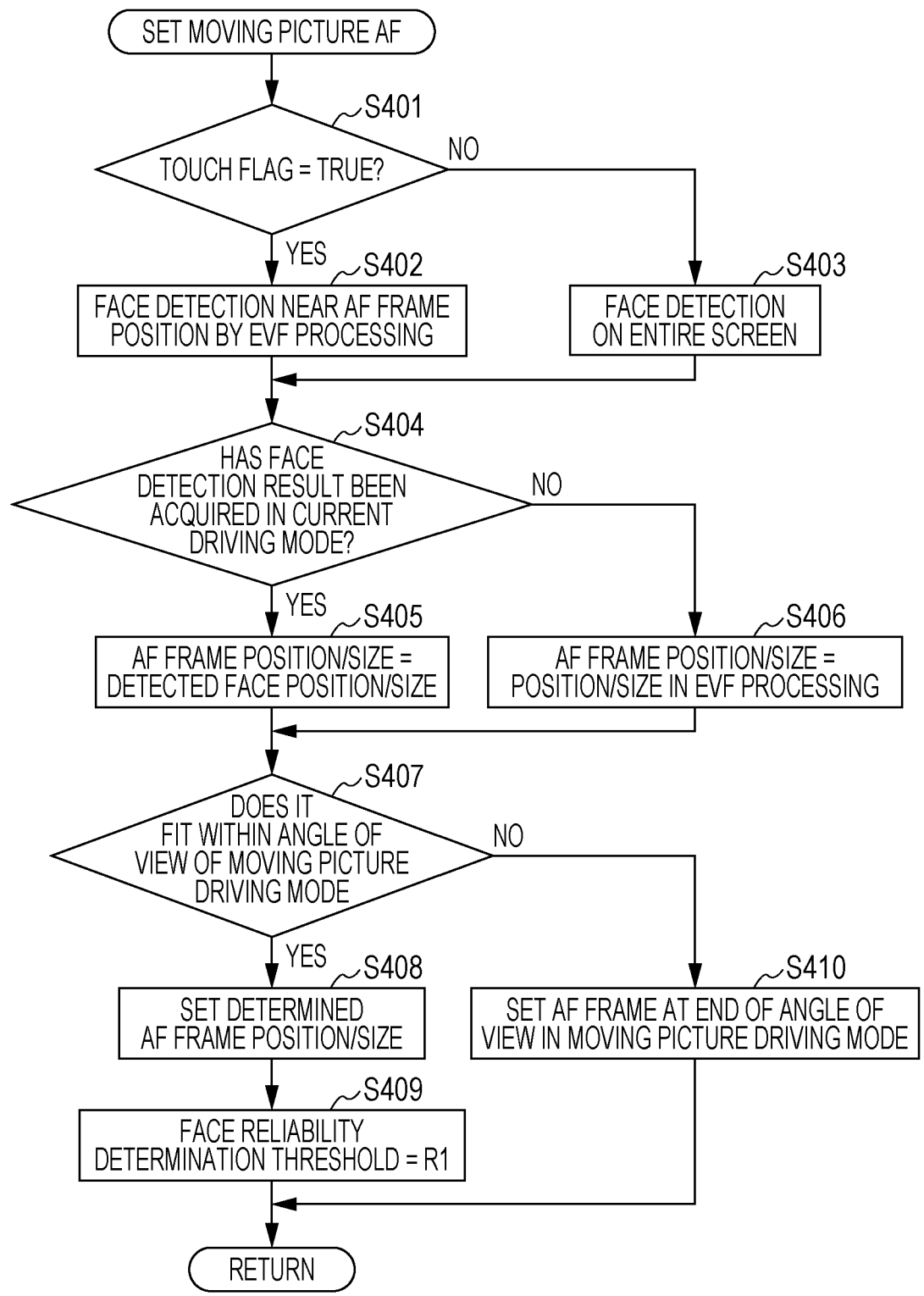
FIG. 4 is a flowchart illustrating an AF frame setting for moving images in FIG. 2.

FIG. 4 is a flowchart illustrating the focal-point detection area setting process for a moving-image capturing operation in S209 in FIG. 2. First, in S401, whether the touch flag set in S312 or S313 in FIG. 3 indicates TRUE or not is determined. If TRUE, the processing moves to S402. If not, the processing moves to S403. In S402, a face detection is performed near the focal-point detection area set in the EVF process.

This is done for continuous detection of a face of a subject designated by touching if any. In S403, a face detection is performed on an entire screen. In this case, because a subject is not designated by touching, a face is detected automatically from the entire screen by the camera.

In S404, in the current driving mode of the image pick-up device 103, that is, the driving mode for a moving image capturing operation set in S207 in FIG. 2, whether any face detection result has been output from the face detecting unit 115 or not is determined. If so, the processing moves to S405. If not, the processing moves to S406.

In S405, a focal-point detection area is defined with the position and size of the face detected in the driving mode for a moving image capturing operation.

In S406, the focal-point detection area is defined with the position and size set in the EVF process.

The reason for performing the processing in S404 to S406 is because the driving mode of the image pick-up device 103 is changed and the image processor 105 processes image data exposed/read in the changed driving mode.

Another reason is that a face detection result is not output immediately after the driving mode is changed because the face detecting unit 115 performs a face detection.

Therefore, a focal-point detection area may be determined in accordance with a face detection result output after a lapse of time from a change of the driving mode if any. If not result has not been output, the focal-point detection area is defined with the position and size set in the EVF process.

In a case where any change occurs in the position and size of the focal-point detection area set in the EVF process, it may be logged. Then, the setting of the focal-point detection area in S406 may be performed based on the log. In a case where it is determined that the position of the focal-point detection area has been moved, the moved position may be inferred from the log for setting. Furthermore, until a face detection result is output in S404, the next moved position may be updated based on the log, and the position of the focal-point detection area may be set based on the update result. The same is true for the size of a focal-point detection area. In this case, the position and size of the focal-point detection area set in S505, which will be described below, may be logged.

In S407, whether the focal-point detection area set in S405 or S406 fits in the angle of view in the driving mode for a moving-image capturing operation is determined. If so, the processing moves to S408. If not, the processing moves to S410. In S408, the focal-point detection area is set with the position and size determined in S405 or S406.

In S409, a reliability determination threshold value for detecting a face by the face detecting unit 115 serving as a subject detecting unit is set to R1. It is assumed that the reliability determination threshold value is preset to R0 in an initialization process, not illustrated. The relationship between R0 and R1 may be expressed as in Expression (1):

$$R0 < R1 \quad (1)$$

In other words, the reliability determination threshold value for performing a face determination in S409 is set stricter than that in an EVF process. The reason is as follows. In order to set a focal-point detection area at the position determined in S405 or S406, a photographer may touch the touch panel 113 to set a focal-point detection area at a designated subject position, as illustrated in FIG. 3.

In this case, the focal-point detection area may be continuously set for a subject intended by a photographer. For that, a face intended by a photographer may be detected for a face detection result to be used for setting a focal-point detection area.

However, in a case where the reliability determination threshold value for face detection is set gently, incorrect detection results may easily be output, and an unintended face may be detected. If this happens during a moving-image capturing operation, an image with focus on a face which is not intended by a photographer may be recorded inconveniently. In order to prevent this, the reliability determination threshold value for face detection is set strictly to allow continuous detection of a face intended by a photographer.

The reliability for face detection reliability may be determined based on the size of a detected face. The reliability determination threshold value in this case may be a threshold value for a face size. Alternatively, template matching may be applied in which the coincidence between a distinctive region of the eyes, nose, mouth, contour or the like and a template is determined for determining the reliability of face detection. The reliability determination threshold value in this case may be a threshold value for coincidence.

In S410, the focal-point detection area is set at a closest position to the position determined in S405 or S406 within the angle of view of the driving mode for moving images, that is, at a screen end of the driving mode for moving images. The size may be set to the one determined in S405 or S406.

The aspect ratio of the driving mode of the image pick-up device 103 is 4:3 in an EVF process in a moving image-capturing standby state and is 16:9 in a moving image capturing operation. A vertically narrower angle of view is obtained for a moving image capturing operation. In a case where the position of the focal-point detection area designated or set during an EVF process is at a vertical end of a screen, it may be off the angle of view for moving image capturing.

Accordingly, whether the thus set focal-point detection area fits within the angle of view in the driving mode for moving image capturing may be determined as in S407 to S410. If not, a focal-point detection area is set at a screen end in the driving mode for moving image capturing.

Having described face detection results with reference to FIG. 4, a similar process may be performed also in a case where an object detection result provided by the object detecting unit 116 is used.

Flowchart Illustrating Focal-Point Detection Area Setting For EVF

Figure 5:
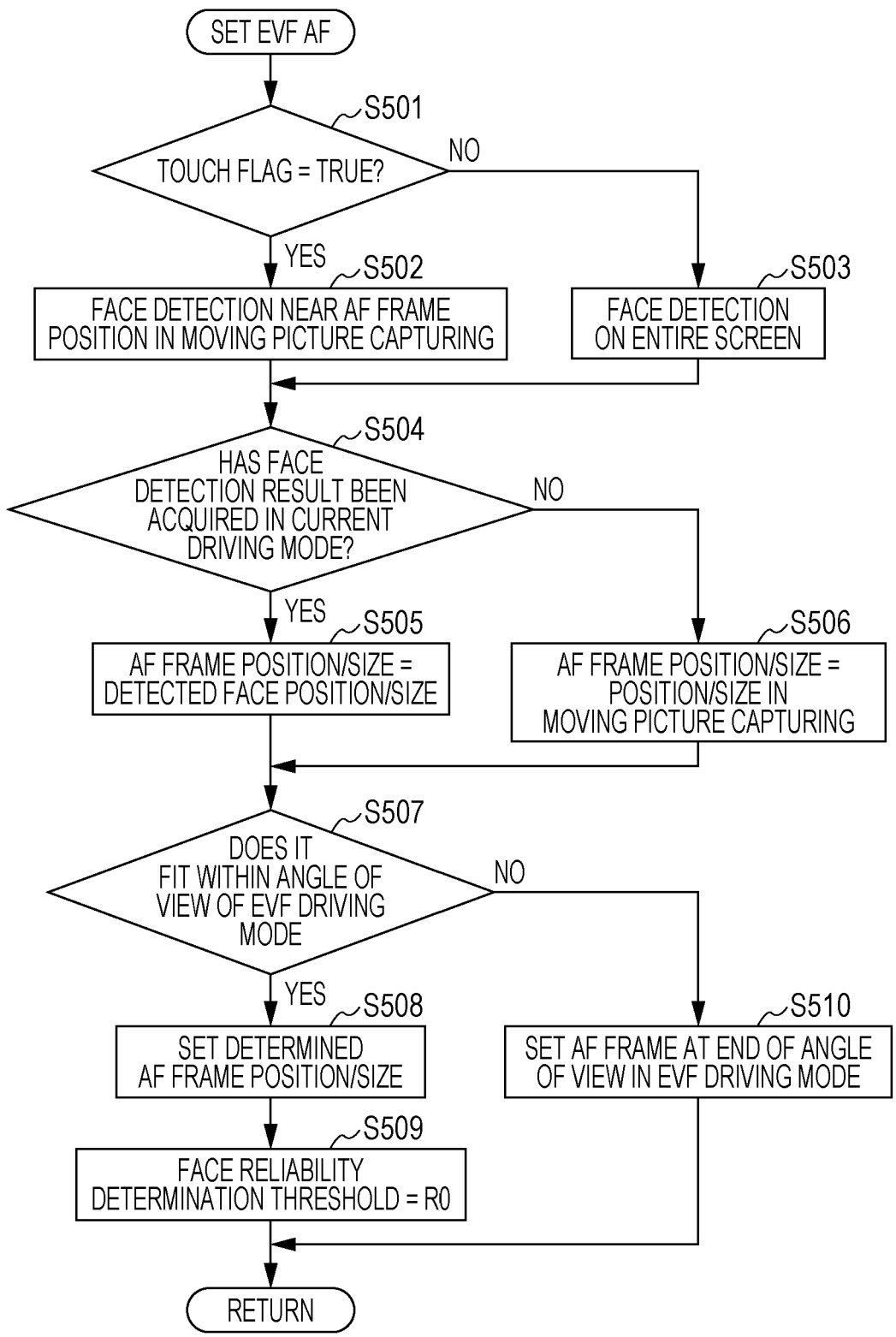
FIG. 5 is a flowchart illustrating an AF frame setting process for EVF in FIG. 2.

FIG. 5 is a flowchart illustrating focal-point detection area setting for EVF in S213 in FIG. 2. First, in S501, whether the touch flag set in S312 or S313 in FIG. 3 indicates TRUE or not is determined. If TRUE, the processing moves to S502. If not, the processing moves to S503. In S502, a face detection is performed near the focal-point detection area set in a moving image capturing process.

This may allow continuous detection of a designated face if a subject is designated by touching. In S503, a face detection is performed on an entire screen. In this case, because a subject is not designated by touching, the camera automatically detects a face from the entire screen.

In S504, whether a face detection result has been output from the face detecting unit 115 in the current driving mode of the image pick-up device 103, that is, in the EVF driving mode set in S212 in FIG. 2 or not is determined. If so, the processing moves to S505. If not, the processing moves to S506.

In S505, the focal-point detection area is defined with the position and size of the face detected in the EVF driving mode. In S506, the focal-point detection area is defined with the position and size set in the moving image capturing process. The reason for performing the process as in S504 to S506 is the same as described regarding the process in S404 to S406 in FIG. 4.

Like the operation in which the position and size of the focal-point detection area for recording moving images, the position and size of a focal-point detection area during a moving image capturing operation may be logged. Then, the log may be used to determine the position and size of a focal-point detection area for an EVF process. In this case, the position and size of the focal-point detection area set in S405 as described above may be logged.

In S507, whether the focal-point detection area determined in S505 or S506 fits within the angle of view for the EVF driving mode or not is determined. If so, the processing moves to S508. If not, the processing moves to S510. In S508, the focal-point detection area is set to have the position and size determined in S505 or S506.

In S509, the reliability determination threshold value for detecting a face in the face detecting unit 115 is set to R0. In other words, in S509, a gentler reliability determination threshold value for face detection is set than that for moving image capturing. During an EVF process, that is, in an image-capturing standby state, because incorrect face detections to some extent are not recorded, a gentler threshold value is set by giving priority to easy detection of a new face.

In S510, the focal-point detection area is set at a closest position to the position determined in S505 or S506 within the angle of view of the driving mode for moving images, that is, at a screen end of the driving mode for EVF. The size may be set to the one determined in S505 or S506.

Figure 6:
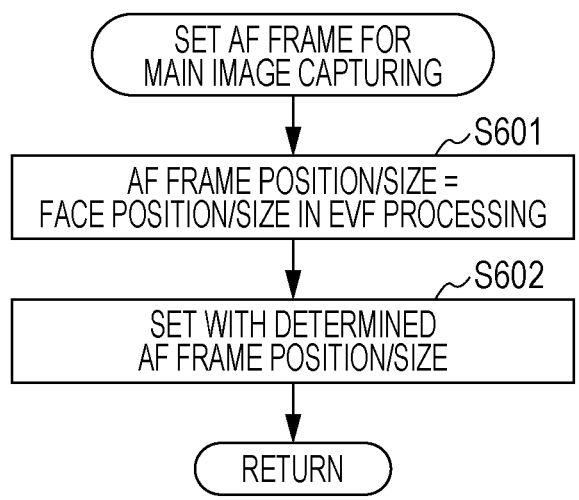
FIG. 6 is a flowchart illustrating an AF frame setting process for image-capturing AF in FIG. 2.

Flowchart Illustrating Focal-Point Detection Area Setting For Main Image-Capturing FIG. 6 is a flowchart illustrating focal-point detection area setting for main image-capturing in S215 in FIG. 2. First in S601, a focal-point detection area is defined with the position and size set for the EVF process. In S602, a focal-point detection area is defined with the position and size determined in S601. Because the aspect ratios in the EVF driving mode and AF driving mode for main image-capturing of the image pick-up device 103 are both 4:3, the position and size set for the focal-point detection area in the EVF process are also used for the AF driving mode for main image-capturing as they are.

According to this exemplary embodiment, a case will be considered in which a focal-point detection area is instructed by an instruction unit in a first image capturing recording mode and then a second image capturing recording mode is started.

In this case, until a specific subject is detected by a subject detecting unit after the second image capturing recording mode is started, the position of a focal-point detection area for the second image capturing recording mode is determined based on the position of the focal-point detection area for the first image capturing recording mode.

More specifically, in a case where moving-image recording is started after a focal-point detection area is instructed and if a specific subject is not detected after moving image recording is started, the position of the focal-point detection area instructed before moving image recording is started is maintained.

Thus, a subject desired by a photographer may be kept in focus by setting a focal-point detection area at a subject position designated by the photographer in a moving image-capturing standby state and, for moving image recording, continuously setting the focal-point detection area at a subject position designated in the moving image-capturing standby.

In a case where a result of detection of a face or an object is not output immediately after a moving image recording operation is started and thus immediately after a switching of the driving mode of the image pick-up device 103, the position and size of the focal-point detection area in the standby state may be taken over to prevent a blank period when no focal-point detection area is allowed to be set.

In a case where a focal-point detection area is not allowed to be set at the same position as that in a standby because the aspect ratios of the image pick-up device 103 differ in a moving-image standby state and in a recording state, the position may be changed to avoid the setting-disabled state.

In a case where the focal-point detection area instructed by the instruction unit before moving image recording is started does not fit to the angle of view after the moving image recording is started, the focal-point detection area instructed by the instruction unit before the moving image recording is started is moved to inside of the angle of view.

Having described the present invention with reference to exemplary embodiments, the present invention is not limited to those specific exemplary embodiments but various aspects without departing from the spirit and scope of the present invention are included in the present invention. Parts of the aforementioned exemplary embodiments may be combined as required.

Cases where a software program that implements a function of any of the aforementioned exemplary embodiments may be supplied from a recording medium to a system or an apparatus including a program-executable computer directly or via a wired/wireless communication and the program is executed are also included in the present invention.

In order to implement functionality/processes of the present invention in a computer, program code to be supplied and installed to and in the computer also implement the present invention. In other words, a computer program itself for implementing functionality/processes of the present invention is also included in the present invention.

In this case, such a program may have any form such as object code, interpreter-executable program, and script data supplied to an OS, as far as it functions as a program.

A recording medium to which a program is supplied may be a magnetic recording medium, a magneto-optical recording medium, or a non-volatile semiconductor memory, for example, including a hard disk and a magnetic tape, for example.

A program may be supplied by storing a computer program forming the present invention in a server on a computer network from which a client computer connecting thereto may download and execute the computer program.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even after a moving image capturing operation starts, a focal-point detection area may be set correctly for a subject designated in a moving image-capturing standby state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171639, filed Aug. 21, 2013, and No. 2014-104494, filed May 20, 2014, which are hereby incorporated by reference herein in their entirety.

What is claimed is:

1. An imaging apparatus comprising:
   an image pick-up device;
   a subject detecting unit configured to detect a subject identified by using an output from the image pick-up device;
   a focus adjusting unit configured to perform focus adjustment by using a focal point detection signal acquired by detecting a subject image corresponding to a focal-point detection area including the identified subject by using the image pick-up device; and
   an instruction unit configured to instruct a position of the focal-point detection area,
   wherein a first image capturing recording mode and a second image capturing recording mode are provided which present screens having different aspect ratios; and
   in a case where the second image capturing recording mode is started after the focal-point detection area is instructed by the instruction unit in the first image capturing recording mode, a position of a focal-point detection area in the second image capturing recording mode is determined based on a position of a focal-point detection area in the first image capturing recording mode until the identified subject is detected by the subject detecting unit after the second image capturing recording mode is started.

2. The imaging apparatus according to claim 1, wherein in a case where the second image capturing recording mode is started after the focal-point detection area is instructed by the instruction unit in the first image capturing recording mode, a position of a focal-point detection area in the first image capturing recording mode is maintained until the identified subject is detected by the subject detecting unit after the second image capturing recording mode is started.

3. The imaging apparatus according to claim 1, wherein the first image capturing recording mode is a still picture recording mode, and the second image capturing recording mode is a moving image recording mode.

4. The imaging apparatus according to claim 1, wherein, in the first image capturing recording mode does not fit within an angle of view after the second image capturing recording mode is started, the focal-point detection area in the first image capturing recording mode is moved into the angle of view in a case where the focal-point detection area.

5. The imaging apparatus according to claim 1, wherein a threshold value for reliability determination on subject identified by the subject detecting unit after the second image capturing recording mode is started is higher than threshold value for reliability determination on a subject identified by the subject detecting unit in the first image capturing recording mode.

6. The imaging apparatus according to claim 1, wherein the instruction unit is a touch panel.

7. The imaging apparatus according to claim 1, wherein the identified subject is a face.

8. The imaging apparatus according to claim 1, wherein a threshold value for reliability determination on subject identified by the subject detecting unit after the first image capturing recording mode is started is lower than threshold value for reliability determination on a subject identified by the subject detecting unit in the second image capturing recording mode.

9. The imaging apparatus according to claim 1, wherein in a case where first image capturing recording mode is started after the focal-point detection area is instructed by the instruction unit before the second image capturing recording mode is stopped, a position of a focal-point detection area in the second image capturing recording mode is maintained until the identified subject is detected by the subject detecting unit after the first image capturing recording mode is started.

10. An imaging method comprising:
    detecting a subject identified by using an output from an image pick-up device;
    performing focus adjustment by using a focal point detection signal acquired by detecting a subject image corresponding to a focal-point detection area including the identified subject by using the image pick-up device; and
    instructing a position of the focal-point detection area,
    wherein a first image capturing recording mode and a second image capturing recording mode are provided which present screens having different aspect ratios; and
    in a case where the second image capturing recording mode is started after the focal-point detection area is instructed by the instructing in the first image capturing recording mode, a position of a focal-point detection area in the second image capturing recording mode is determined based on a position of a focal-point detection area in the first image capturing recording mode until the identified subject is detected by the subject detecting after the second image capturing recording mode is started.

* * * * *